US012257692B2

(12) United States Patent
Zhu

(10) Patent No.: US 12,257,692 B2

(45) Date of Patent: Mar. 25, 2025

(54) MULTI-FUNCTIONAL WORKBENCH

(71) Applicant: Winslow & Ross Inc., Raleigh, NC (US)

(72) Inventor: Hansong Zhu, Jinhua (CN)

(73) Assignee: Winslow & Ross Inc., Raleigh, NC (US)

( * ) Notice: Subject to any disclaimer, the term of this patent is extended or adjusted under 35 U.S.C. 154(b) by 0 days.

(21) Appl. No.: 17/767,572

(22) PCT Filed: Oct. 10, 2020

(86) PCT No.: PCT/US2020/054927

§ 371 (c)(1),
(2) Date: Apr. 8, 2022

(87) PCT Pub. No.: WO2021/072158

PCT Pub. Date: Apr. 15, 2021

(65) Prior Publication Data

US 2024/0083012 A1 Mar. 14, 2024

(30) Foreign Application Priority Data

Oct. 9, 2019 (CN) ........................ 201921675819.2

(51) Int. Cl.
*B25H 1/04* (2006.01)
*B25H 1/16* (2006.01)

(52) U.S. Cl.
CPC ................ *B25H 1/04* (2013.01); *B25H 1/16* (2013.01)

(58) Field of Classification Search
CPC ... B25H 1/04; B25H 1/08; B25H 1/10; B25H 1/12; B25H 1/16

(Continued)

(56) References Cited

U.S. PATENT DOCUMENTS 3,695,567 A * 10/1972 Weagle ................ A47B 3/0815 108/132
4,191,111 A * 3/1980 Emmert ............... A47B 3/0916 248/440

(Continued)

FOREIGN PATENT DOCUMENTS

CN 205097161 U 3/2016
CN 206230474 U 6/2017

(Continued)

OTHER PUBLICATIONS

"Rubi 4 in 1 Foldable Work Table" (CTD Trade)[online](retrieved from the internet on Mar. 12, 2020)<URL https://www .youtube. coni/wc1ld1?v=w8S0y 1 OlfE4>,Jan. 8, 2019 (Jan. 8, 2019); entire document, especially title, para (0003), 0: 16-0:23, 0:28, 0:30, 0:38, 0:52; 0:56, 1:00.

(Continued)

*Primary Examiner* — Jose V Chen

(74) *Attorney, Agent, or Firm* — Rimon PC

(57) ABSTRACT

A multi-functional workbench disclosed herein includes a worktop and supporting legs. The worktop is provided with a girder. The bottom of the girder is provided with a receiving space. Concave-shaped mechanisms are affixed in the receiving space and are connected by square tubes. The supporting legs are rotatably attached to the square tubes and can be received in the receiving space. The workbench further includes one or more locking mechanisms. A first locking mechanism is installed between two supporting legs attached to the same square tube. The first locking mechanism prevents the supporting legs from being disengaged when engaged into the concave-shaped mechanisms. More locking mechanisms can be added to secure the supporting legs when they are folded. The multi-functional workbench (Continued)

can be converted into a worksurface, a sawhorse, a step tool, a creeper, or a pulling tractor.

13 Claims, 17 Drawing Sheets

(58) Field of Classification Search
USPC .............................. 108/28, 25, 129, 132, 133
See application file for complete search history.

(56) References Cited

U.S. PATENT DOCUMENTS

| | | | | | |
|---|---|---|---|---|---|
| 4,715,296 | A * | 12/1987 | Wilkinson | A47C 12/02 108/132 |
| 6,109,191 | A * | 8/2000 | Schworer | E04G 11/483 108/115 |
| 7,549,381 | B1 * | 6/2009 | Nail, Jr. | A47B 21/06 108/26 |
| 7,628,186 | B2 * | 12/2009 | Blum | B25H 1/08 144/286.5 |
| 7,658,388 | B1 * | 2/2010 | Rodriguez | B62B 5/0003 280/30 |
| 8,052,106 | B2 | 11/2011 | Knudsen | |
| 8,132,517 | B2 * | 3/2012 | Leng | A47C 4/22 248/439 |
| 10,343,274 | B2 | 7/2019 | Katz et al. | |
| 11,686,429 | B2 * | 6/2023 | Choi | F16M 11/38 248/166 |
| 2004/0194676 | A1 * | 10/2004 | Degen | A47B 13/16 108/132 |
| 2004/0244656 | A1 * | 12/2004 | Shenghao | A47B 3/0912 108/132 |
| 2004/0255829 | A1 * | 12/2004 | Cizmar | A47B 3/0912 108/132 |
| 2005/0183559 | A1 * | 8/2005 | Rue | B25H 1/04 83/859 |
| 2005/0235886 | A1 * | 10/2005 | Koning | A47B 3/0818 108/132 |
| 2006/0130718 | A1 * | 6/2006 | Lo | B25H 1/04 108/131 |
| 2006/0137938 | A1 | 6/2006 | Hayes | |
| 2008/0245441 | A1 | 10/2008 | Blum | |
| 2009/0145335 | A1 * | 6/2009 | Panosian | B25H 1/04 108/28 |
| 2010/0156017 | A1 * | 6/2010 | Zhang | B25H 1/14 269/289 R |
| 2012/0042809 | A1 * | 2/2012 | Ensley | A47B 3/0815 108/132 |
| 2013/0087081 | A1 * | 4/2013 | Stukenberg | A47F 7/02 108/23 |
| 2015/0201751 | A1 | 7/2015 | Gu | |
| 2017/0087711 | A1 * | 3/2017 | Furlong | B25H 1/04 |
| 2019/0001481 | A1 | 1/2019 | Faibish et al. | |
| 2019/0168374 | A1 | 6/2019 | Hanlon | |
| 2020/0039054 | A1 * | 2/2020 | Baruch | B25H 1/04 |
| 2021/0046634 | A1 * | 2/2021 | Shechtman | B25H 1/06 |
| 2023/0031508 | A1 * | 2/2023 | Delgado | B25H 1/16 |
| 2023/0294267 | A1 * | 9/2023 | Dupin | B25H 1/12 182/153 |
| 2023/0347497 | A1 * | 11/2023 | Li | B25H 1/08 |

FOREIGN PATENT DOCUMENTS

| | | | |
|---|---|---|---|
| CN | 107825371 | A | 3/2018 |
| CN | 207223908 | U | 4/2018 |
| CN | 207578335 | U | 7/2018 |
| GB | 2558910 | A | 7/2018 |
| WO | 01/24975 | A1 | 4/2001 |

OTHER PUBLICATIONS 7-in-1 Work Bench, Platform, & Hand Truck w/ Power Center on QVC (GVCtv)[online](retrived from the internet on Dec. 3, 2020)<URL https://www.youtube.com/watch?v=v9kurzM7rFQ>, Sep. 26, 2019 (Sep. 26, 2019); entire document, especially title, 3:31, 4:13, 5:38.

* cited by examiner

MULTI-FUNCTIONAL WORKBENCH

RELATED APPLICATIONS

This application is a national stage of International Application No. PCT/US2020/054927 filed on Oct. 9, 2020, and titled Multi-Functional Workbench, which claims priority to the Chinese Utility Model Application No. 201921675819.2, filed on Oct. 9, 2019, and titled Multi functional Workbench, the content of the aforementioned applications being incorporated by reference herein in their entireties.

FIELD OF THE TECHNOLOGY

The present disclosure relates to the technical field of multi-functional operation tools, and more particularly, to a multi-functional workbench.

BACKGROUND

Existing workbenches, such as a frame body, a tabletop, or a bench, generally have a simple structure and single function, and cannot be used for multiple purposes as different tools. Moreover, the existing workbenches have relatively limited expansion capabilities, and are not flexible in the joints where a worktop and supporting legs are connected and in the securing mechanism of the supporting legs. They are often unsafe to use and offer rather poor user experience. They generally fall short of users' changing requirements for workbenches.

Therefore, there is an urgent need to develop and design a new workbench to overcome the defects of existing workbenches that are currently available on the market.

SUMMARY

An objective of the present disclosure is to overcome the defects of existing workbenches and to provide an improved and versatile workbench. The workbench in the present disclosure are multi-functional. The workbench has stable and safe supporting legs and is stable and durable. The workbench is relatively small in size and convenient for storage but also has expansion capability. The workbench in the present disclosure offers good user experience.

The present disclosure provides a multi-functional workbench. The multi-functional workbench includes a worktop and supporting legs. The worktop is provided with a girder. The bottom of the girder is provided with a receiving space. Concave-shaped mechanisms are fixed in the receiving space, and are connected by a square tube. Both ends of the square tube are rotatable in the concave structures. The supporting legs are connected to the square tube and can drive the square tube to rotate. The supporting legs may be rotatably received in the receiving space or engaged into the concave-shaped mechanisms to be stowed.

The present application discloses several different locking mechanisms for securing the supporting legs inside the securing space.

A first locking mechanism is disposed between the supporting legs connected to the same square tube, and the first locking mechanism is configured to prevent the supporting legs from being disengaged from the concave-shaped mechanisms while the supporting legs are engaged into the concave-shaped mechanisms. A second locking mechanism is disposed in the girder, and is connected to the square tubes. The second locking mechanism is configured to lock the square tube to prevent it from rotating while the supporting legs are folded and received in the receiving space. A third locking mechanism comprises brackets installed on the underside of the girder. When folded, each supporting leg is clasped into a bracket.

In some embodiments, the first locking mechanism includes two supporting bars and a limiting member. Respective ends of the supporting bars are connected to each other and axially rotatable about a connection point, while the other ends of the supporting bars are connected to the supporting legs. The limiting member is disposed at the connection point to prevent further rotation of the two supporting bars after the two supporting bars are straightened in an aligned position.

In some embodiments, the second locking mechanism includes two locking bars, a locking member, a girder securing member, and a square tube securing member. The girder securing member is affixed at the bottom of the girder, and the square tube securing member is secured to the square tube. One end of each of the two locking bars are connected to each other at a connection point and axially rotatable about the connection point while the other end of the two locking bars are rotatably connected to the girder securing member and the square tube securing member, respectively. The locking member is disposed at the connection point to prevent further rotation of the two locking bars after they are aligned in a straight line after rotation.

In the present disclosure, each concave-shaped mechanism has a recess. A square tube is disposed into the recesses of two opposite concave-shaped mechanisms and connects the two concave-shaped mechanisms. Two supporting legs are connected to the square tube in between the recesses, and protrusions on the recesses at both ends of the square tube restrict further rotation of the supporting legs when the supporting legs are engaged into the recesses after rotating.

In some embodiments, the worktop is provided with a beam structure for load bearing and distribution. The beam structure includes two long beams at both ends of the worktop and short beams disposed in between the two long beams on the underside of the worktop.

In some embodiments, the bottom of the worktop is provided with detachable rollers.

In some embodiments, each of the supporting legs comprises a first supporting leg member and a second supporting leg member that are coaxially disposed. The first supporting leg member may be received in the second supporting leg member, and the received length of the first supporting leg member is controlled by a lock, e.g., a flip lock or a twist lock.

In some embodiments, the surface of the worktop is configured with a length scale and an angle scale.

In some embodiments, an edge of the worktop is provided with traction pins. The surface of the worktop may include at least one tool tray. The worktop is provided with at least one expandable connection through hole along a thickness or height direction. The worktop may be further provided with a socket module.

Compared with the existing workbench, the workbench proposed by the present disclosure offers different user experience and provides multiple household functions that are accommodated in one product. The workbench can also be retracted and folded when not in use to reduce the storage space. The workbench is stable and easy to operate. The workbench is convenient to carry along, and quite simple to switch between various modes. The workbench also has expansibility. For example, a connection hole is provided on the surface of the workbench to facilitate installation of small accessories that can expand the functionality and the application range of the workbench.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

Below is a list of reference numbers and corresponding referenced parts.

100—workbench; 1—worktop; 2—supporting leg; 3—girder; 4—receiving space; 5—concave-shaped mechanism; 6—square tube; 7—first locking mechanism; 8—second locking mechanism; 9—third locking mechanism; 10—clamp; 11—length scale; 12—angle scale; 13—traction pin; 14—tool tray; 15—expandable connection through hole; 16—socket module; 17—roller; 21—first supporting leg member; 22—second supporting leg member; 23—leg lock; 51—recess; 52—protrusion; 71—supporting bar; 72—limiting member; 81—locking bar; 82—locking member; 91—long beam; 92—short beam; 101—connector; 103—backer.

DETAILED DESCRIPTION

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
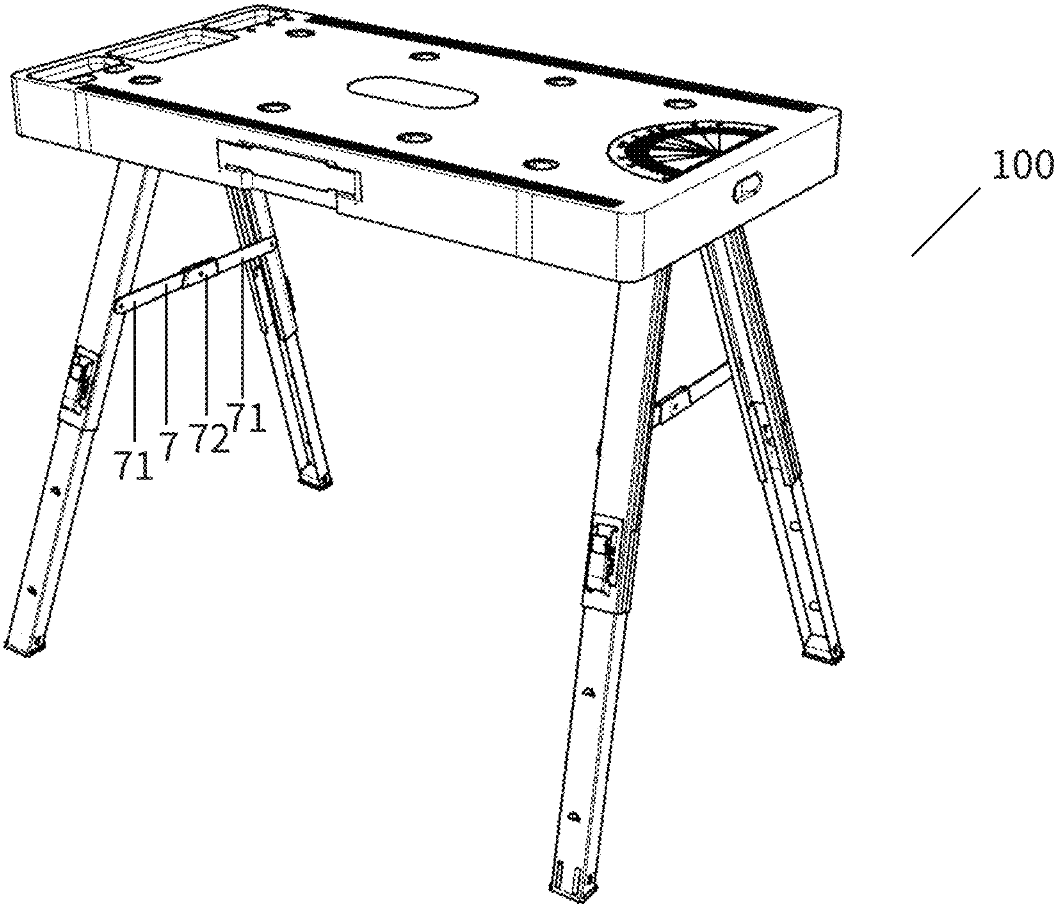
FIG. 1 is a perspective view of an embodiment of the multi-functional workbench configured in a workbench/sawhorse mode.
Figure 2:
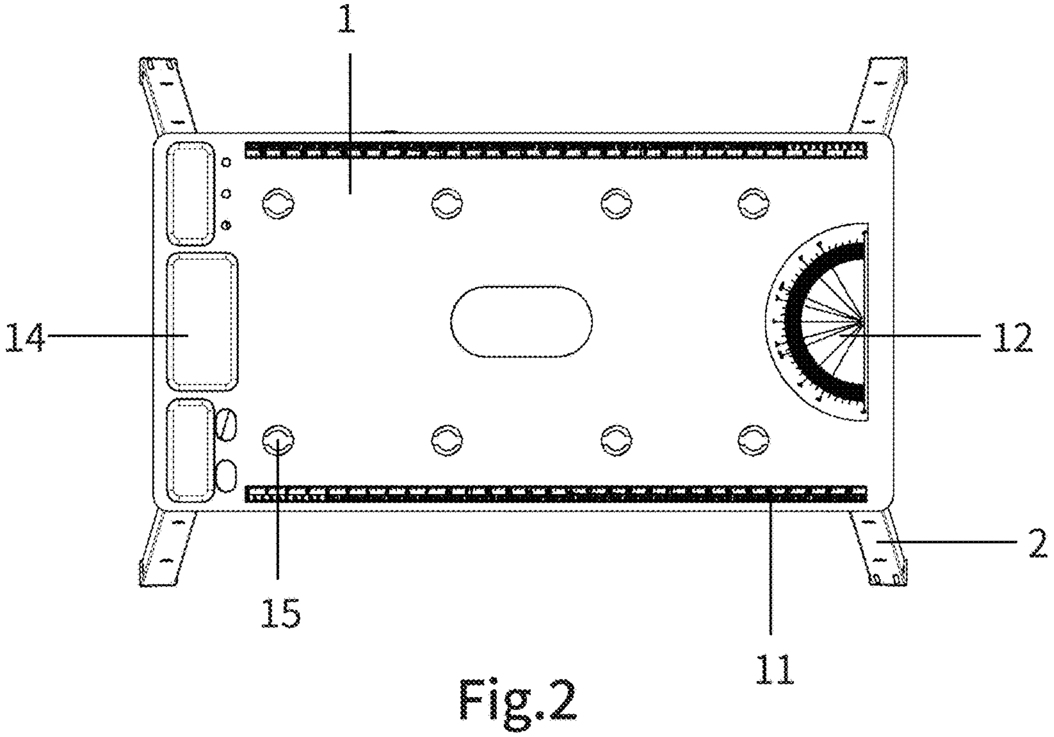
FIG. 2 is a top view of an embodiment of the multi-functional workbench.

As shown in FIG. 1 and FIG. 2, the present disclosure provides a multi-functional workbench 100 that includes: a worktop 1 and supporting legs 2. The worktop 1 is provided with a girder 3 on the underside (see FIG. 12). The bottom of the girder 3 is provided with a receiving space. Four concave-shaped mechanisms 5 (shown in FIG. 3) are welded in the receiving space and are connected by square tubes 6 (shown in FIG. 12).

Figure 3:
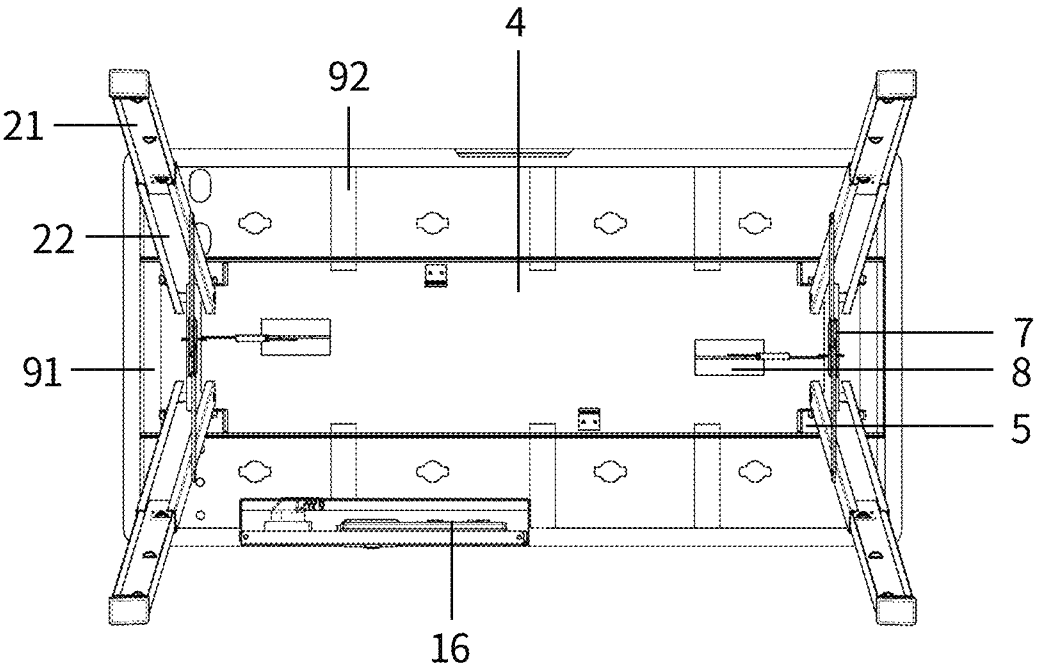
FIG. 3 is a bottom view of an embodiment of the multi-functional workbench.
Figure 12:
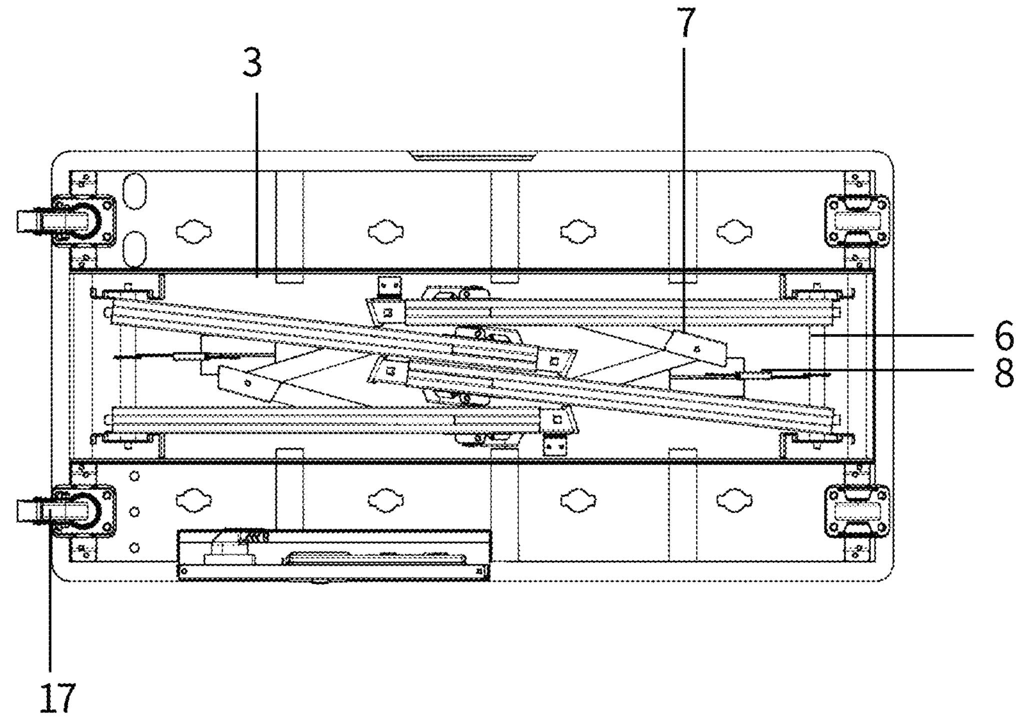
Figure 13:
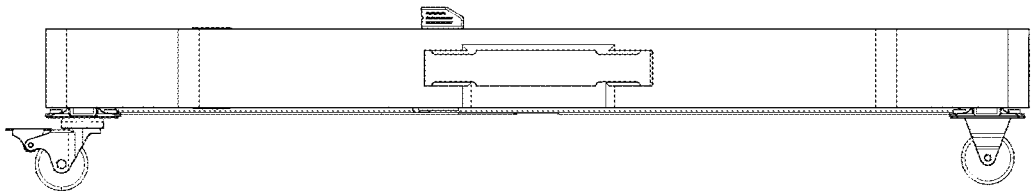
Figure 14:
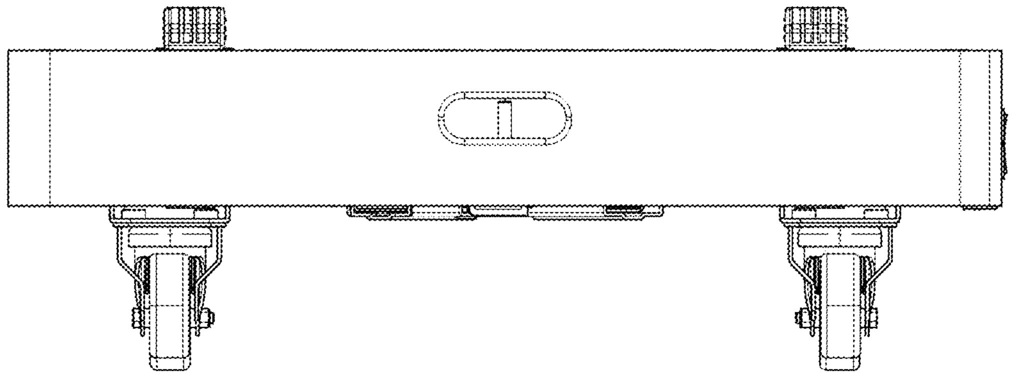

As shown in FIG. 3 and FIG. 12, both ends of each square tube 6 are received in the concave-shaped mechanisms 5. The square tubes 6 are rotatable. The supporting legs 2 are connected to the square tubes 6 and can drive the rotation of the square tubes 6. The supporting legs 2 may be rotatably received in the receiving space or engageable into the concave-shaped mechanisms 5 to be secured. A first locking mechanism 7 is disposed between the supporting legs 2 connected to the same square tube 6. The first locking mechanism 7 secures the supporting legs 2 in a standing pose while the workbench 100 is unfolded and stands on the supporting legs 2. A second locking mechanism 8 is disposed on the girder 3, and is connected to the square tubes 6. The second locking mechanism 8 is configured to lock the square tubes to prevent them from rotating while the supporting legs 6 are received in the receiving space.

As shown in FIG. 1, the first locking mechanism 7 includes two supporting bars 71 and a limiting member 72. Respective ends of the supporting bars 71 are connected to each other and axially rotatable about a connection point while the other ends are connected to the supporting legs 2. The limiting member 72 is disposed at the connection point to prevent the continuous rotation of the two supporting bars 71 after the two supporting bars 71 are straightened in a fully open position.

Figure 19:
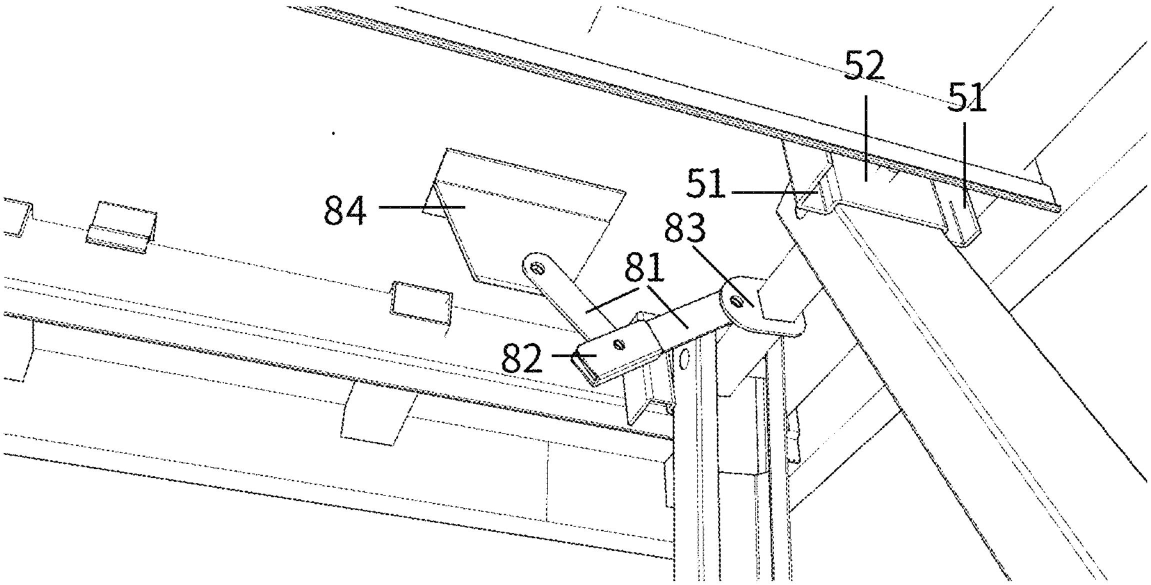
FIG. 19 is a schematic diagram of a concave-shaped mechanism and a second locking mechanism according to the present disclosure.
Figure 20:
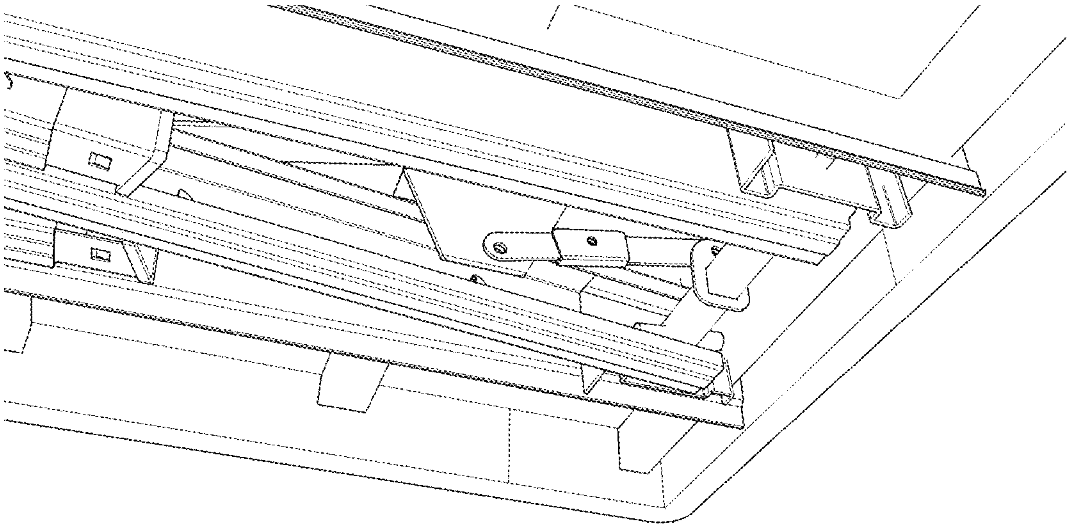
FIG. 20 is a schematic diagram of an engaged state of a second locking mechanism according to the present disclosure.

As shown in FIG. 19, the second locking mechanism 8 includes two locking bars 81, a locking member 82, a square tube securing member 83, and a girder securing member 84. The girder securing member 84 is fixed at the bottom of the girder 3. The square tube securing member 83 is secured to a square tube 6. Respective ends of the two locking bars 81 are connected to each other and axially rotatable about a connection point while the other ends are rotatably connected to the girder securing member 84 and the square tube securing member 83, respectively. The locking member 82 is disposed at the connection point to prevent the continuous rotation of the two locking bars 81 after the two locking bars 81 are straightened into a fully open position by rotation.

As shown in FIG. 19, each concave-shaped mechanism 5 are configured with recesses 51. The recesses 51 connected to the same square tube 6 are disposed oppositely. The supporting legs 2 are connected to the square tube 6 and positioned in between the recesses 51. Protrusions 52 of the recesses 51 are configured to restrict the continuing rotation of the supporting legs 2 when the supporting legs 2 are engaged into the recesses 51.

As shown in FIG. 3, the worktop 1 is provided with beams to distribute the bearing load. The beams includes long beams 91 on two sides and a plurality of short beams 92 arranged in between the two long beams along the other two sides of the worktop. Generally, the worktop 1 is designed to bear relatively heavy load, for example, allowing users to step on the worktop 1. The worktop is supported in the center by a girder 3, which is an iron piece. Multiple distributed small beams 92 in a diffused pattern are adopted to bear the load and distribute the load bearing in order to provide edge support. Since an iron piece is stronger and has stronger load-bearing capability, if the plastic part of the worktop 1 is not supported by the girder underneath, the workbench's load-bearing capacity will be relatively poor. In the present embodiment, the iron piece is structured like a spider web arranged to distribute the bearing load.

In some embodiments, the bottom of the worktop is provided with detachable rollers 17 as shown in FIG. 12.

Figure 4:
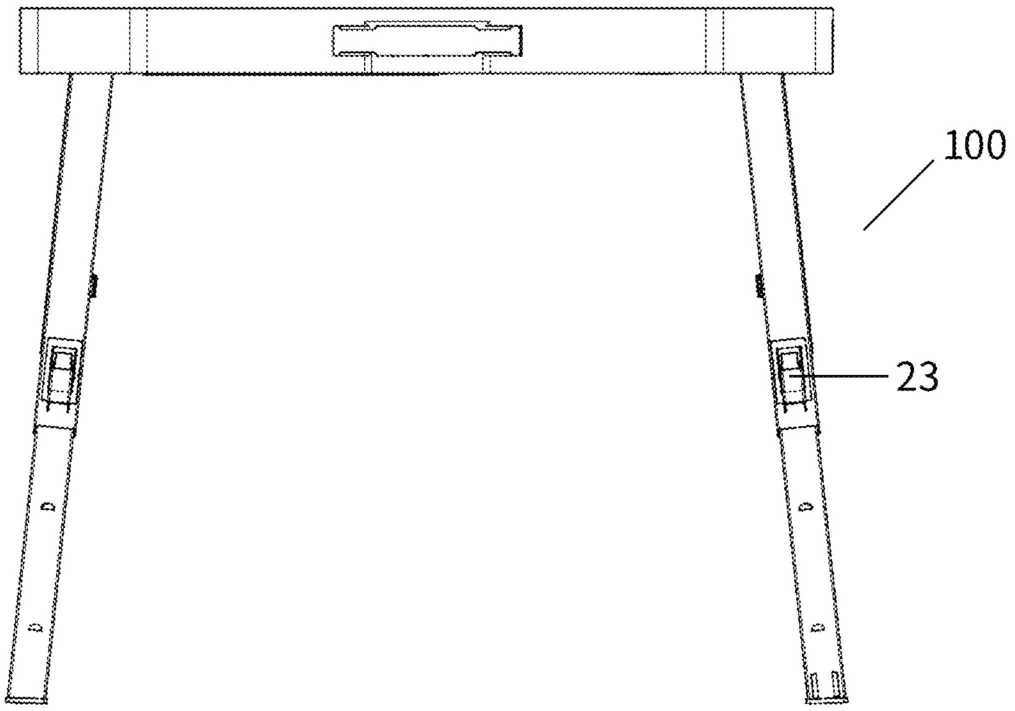
FIG. 4 is a front view of an embodiment of the multi-functional workbench.

In some embodiments, each supporting leg 2 has a first supporting leg member 21 and a second supporting leg member 22 as shown in FIG. 3. The first supporting leg member 21 and the second supporting leg member 22 are coaxially disposed. The first supporting leg member 21 is received in the second supporting leg member 22. The received length of the first supporting leg member 21 is controlled by a leg lock 23 shown in FIG. 4. The leg lock 23 may be a flip lock or a twist lock or any other types of locks. Once secured, the leg lock 23 can prevent the first supporting leg member 21 from sliding in the second supporting leg member 22.

In some embodiments, the surface of the worktop 1 may be configured with a length scale 11 and an angle scale 12, as shown in FIG. 2. The surface of the worktop 1 may be configured with at least one tool tray 14.

Figure 5:
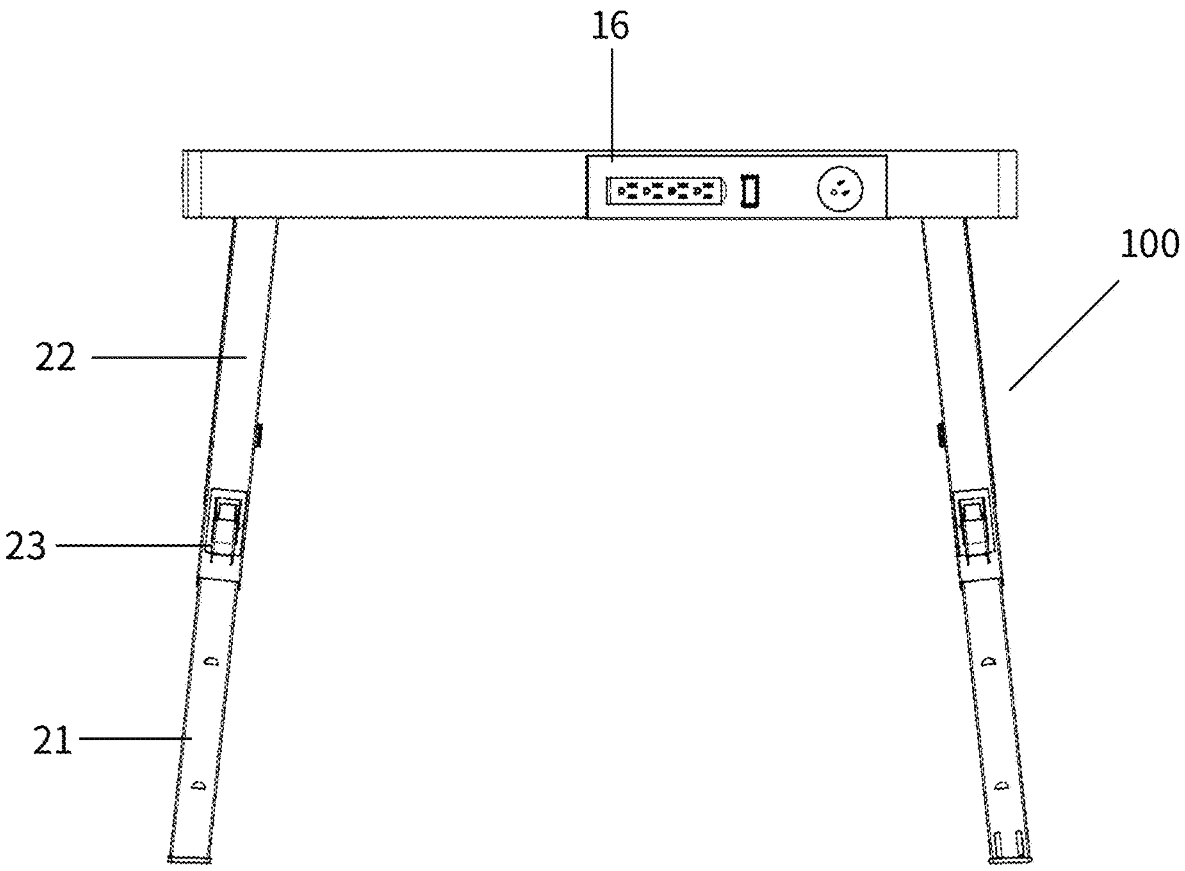
FIG. 5 is a back view of an embodiment the multi-functional workbench.
Figure 6:
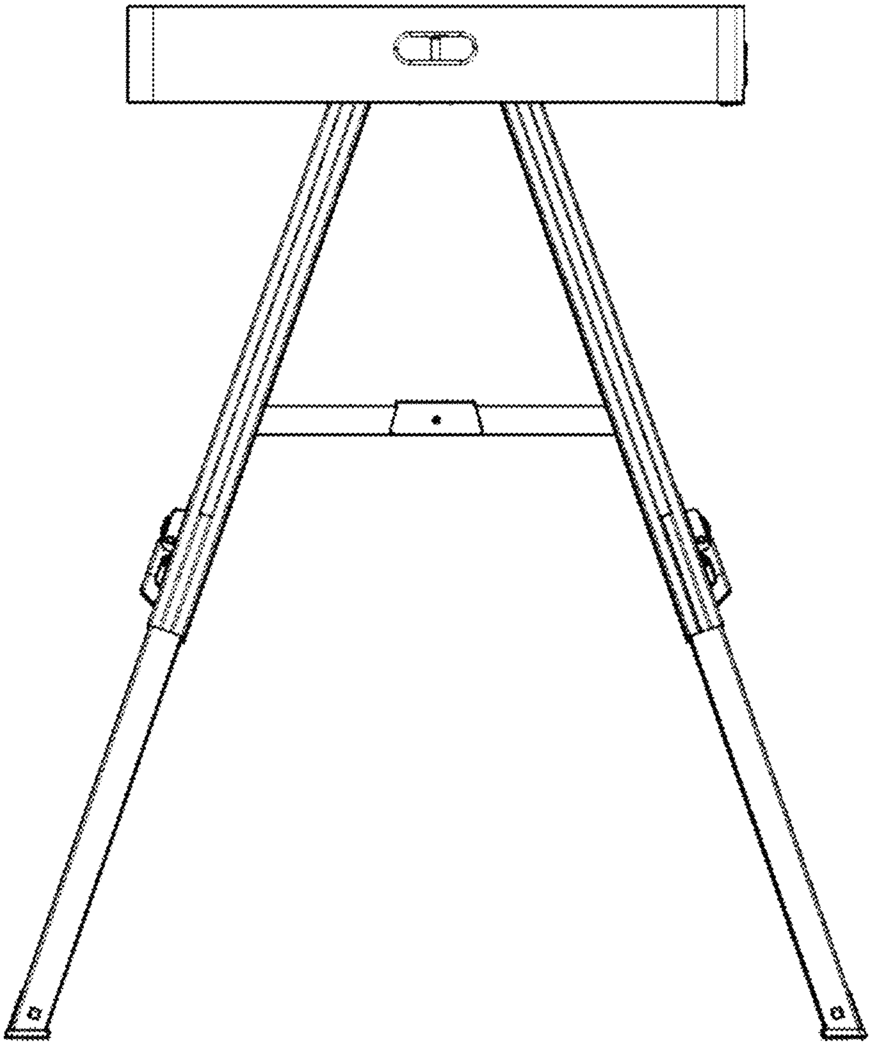
FIG. 6 is a side view of an embodiment of the multi-functional workbench.
Figure 9:
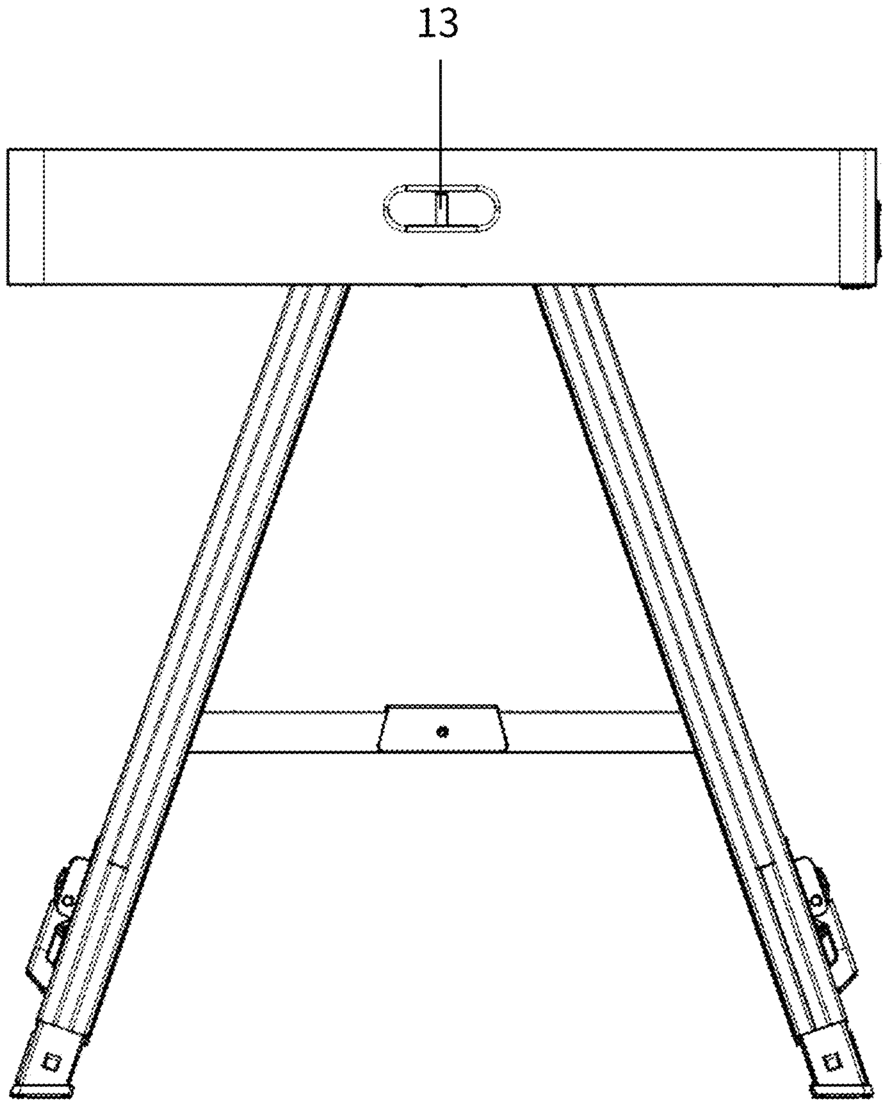
Figure 10:
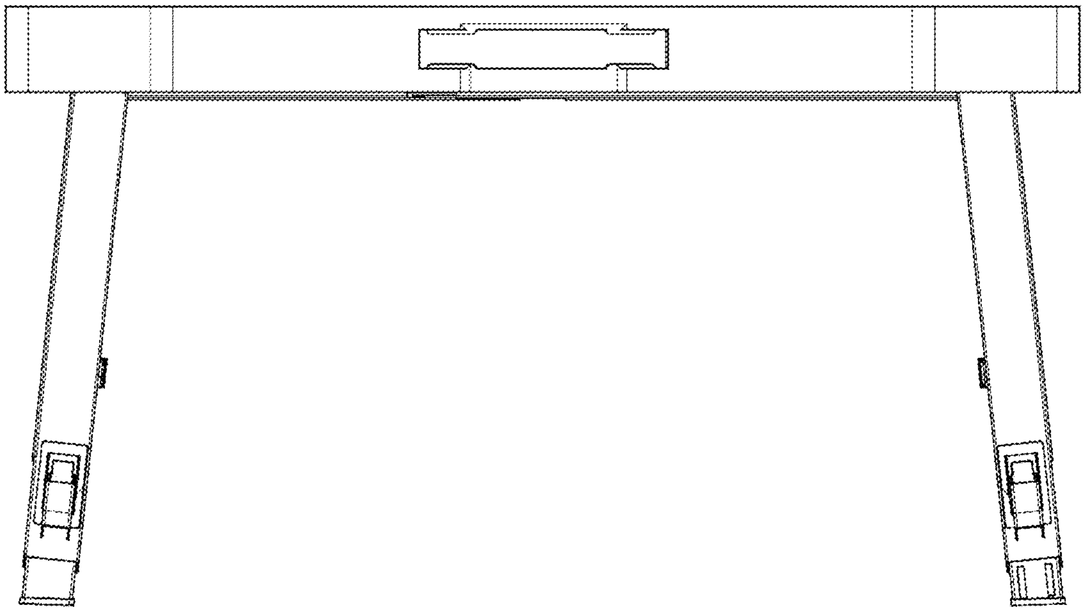
Figure 11:
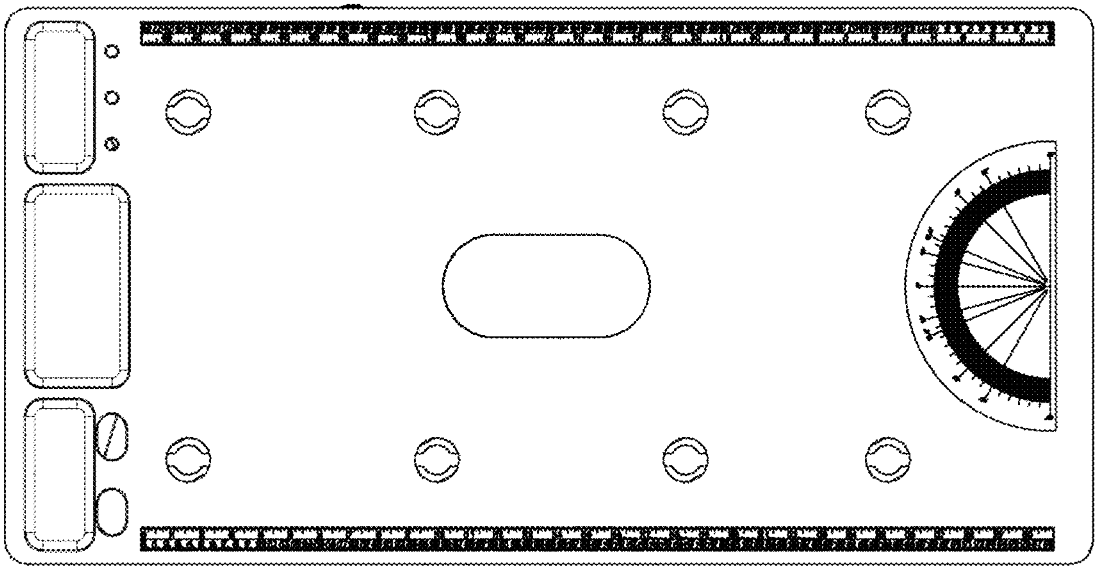
FIG. 11 to FIG. 15 are schematic diagrams of a creeper/tractor mode according to the present disclosure.
Figure 18:
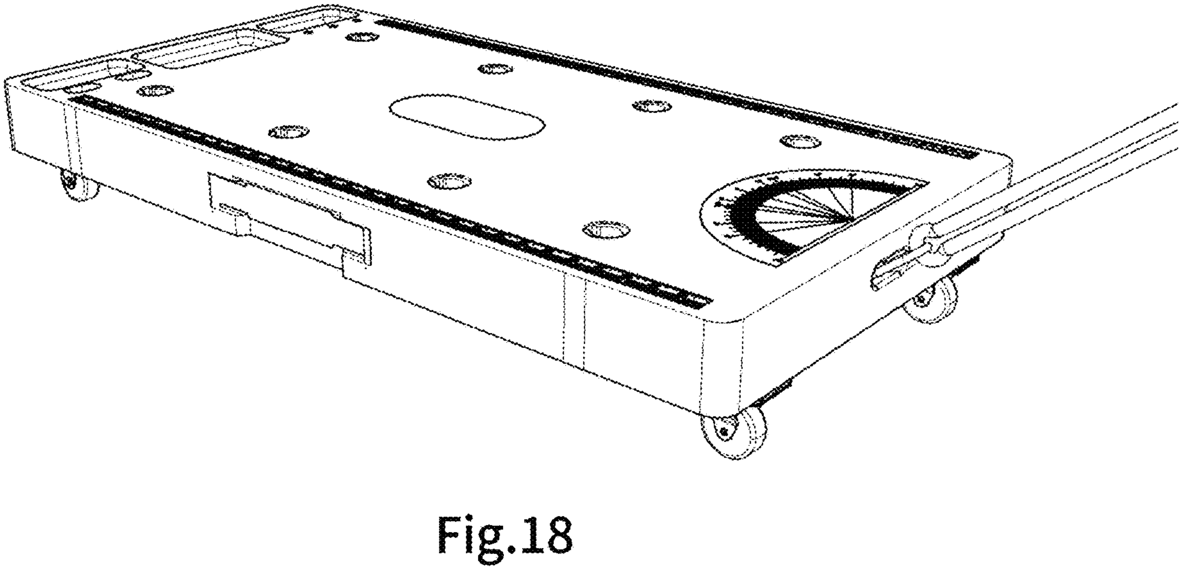
FIG. 18 is a schematic diagram of a tractor mode according to the present disclosure.

In some embodiments, an edge of the worktop 1 is provided with a traction pin 13 as shown in FIG. 9. The traction pin 13 can be hooked to or linked with a handle, to convert the workbench into a pulling tractor as shown in FIG. 18. In some embodiments, the worktop 1 is provided with a socket module 16 as shown in FIG. 5. The socket module 16 can be configured to house electric outlets.

In some embodiments, the worktop 1 is provided with at least one expandable connection through hole 15 along the depth or thickness direction. The worktop 1 may be used with expansion members such as a clamp 10 and/or a connector 101 (shown in FIG. 17) through the expandable connection through hole 15. See FIG. 2 and FIG. 21.

Figure 17:
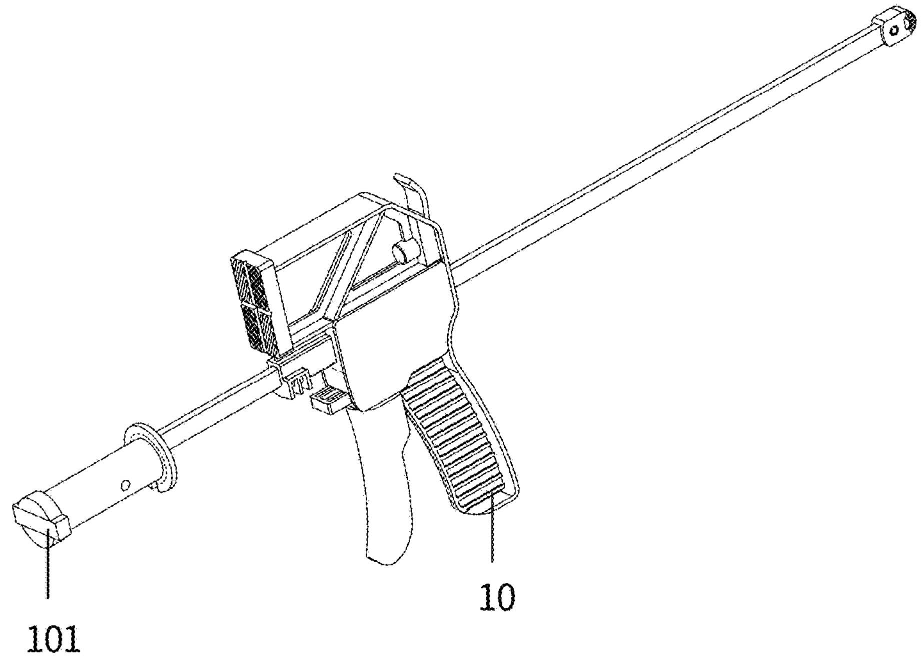
FIG. 17 is a schematic diagram of an embodiment of a clamp according to the present disclosure.
Figure 21:
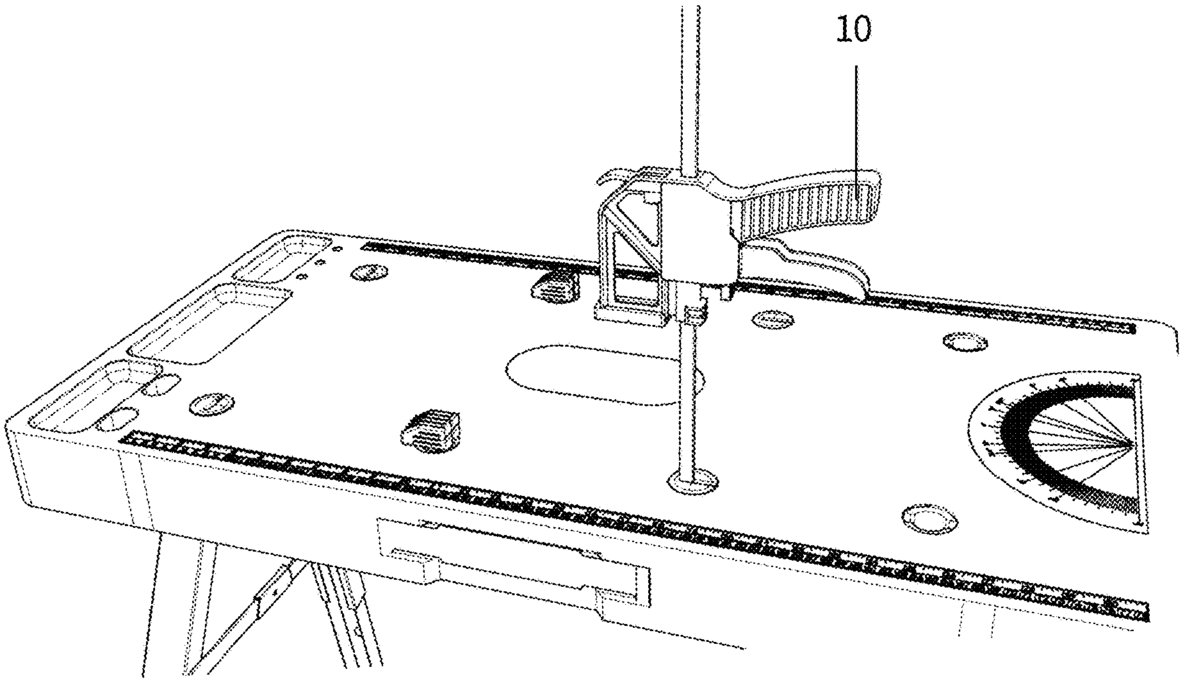
FIG. 21 illustrates an embodiment of clamp attached to a connector that is inserted into one of the expandable connection through hole.

As shown in FIG. 17, a connector 101 may be used with a woodworking clamp 10 to secure a workpiece before operation. The woodworking clamp 10 comprises three parts: a large plastic part, a small plastic part and a pin. The large plastic part is a movable part, which may move in only one direction, not movable in the opposite direction, under the operation of a pressing rod. An unlocking button can be pressed to loosen the clamp 10 after locking. The small plastic part is detachable. All clamp iron rods are provided with a locking hole separately. In one embodiment, after the small plastic part of the clamp is removed, the clamp 10 is inserted into the connector 101, and then the pin is inserted through a pin hole into a locking hole to lock. As shown in FIG. 21, the connector 101 (not shown) may be inserted into one of the multiple expandable connection through holes 15 on the workbench, to make it easy to secure a workpiece using a clamp 10.

Figure 16:
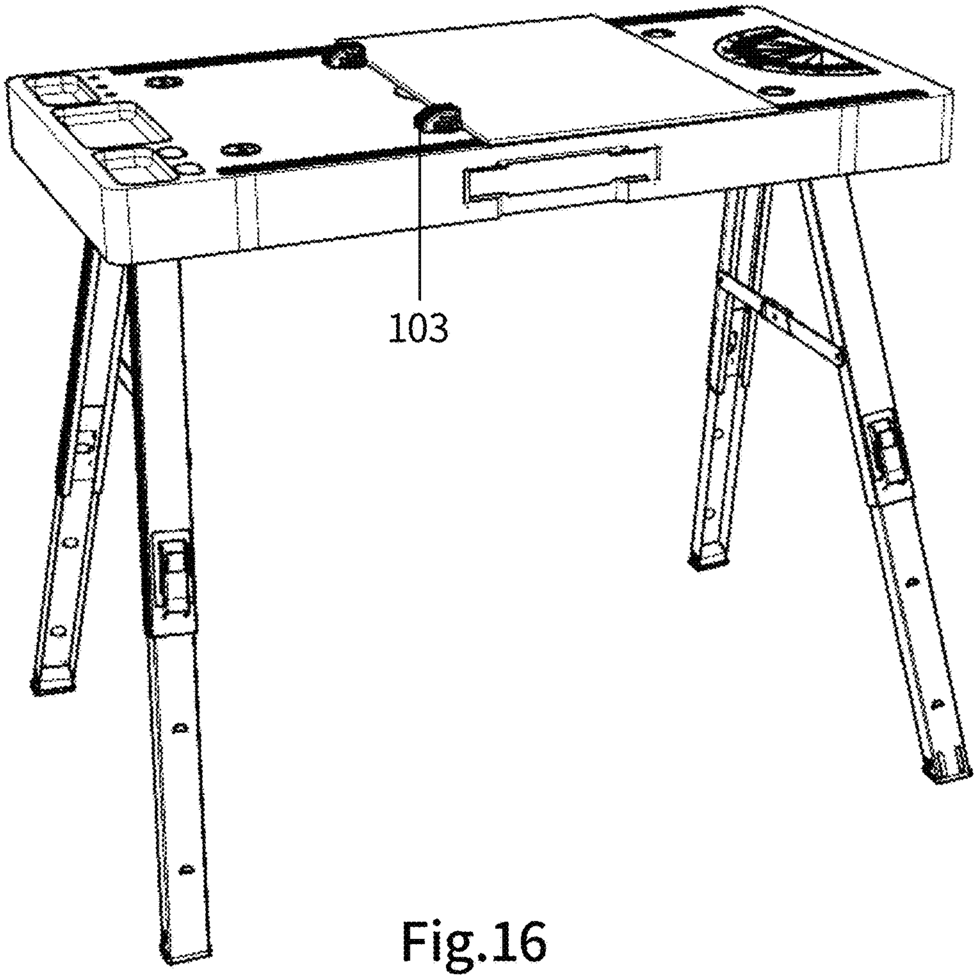
FIG. 16 illustrates an embodiment of the multi-functional workbench configured with a backer.

In some embodiments, the workbench may be configured with a backer piece 103 used to limit the movement of an object. See FIG. 17 and FIG. 16. With a clamp 10 or backer 103, the workbench can be converted into a sawhorse.

Figure 15:
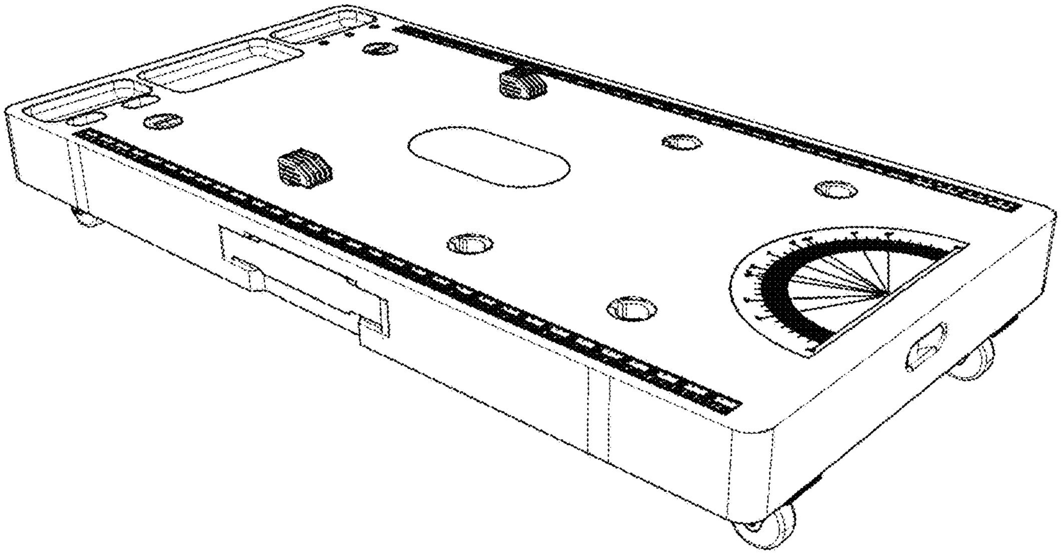

In some embodiments, the workbench 100 is provided with detachable rollers 17 as shown in FIG. 12. The workbench can be used as a creeper or pulling tractor as shown in FIG. 15 or FIG. 18. The creeper or tractor mode may be selected according to actual demands.

In some embodiments, when the supporting legs 2 are folded and received in the receiving space of the girder, the second locking mechanism can be pressed down to lock the square tube. When locked, the square tube cannot rotate. The structure of the second locking mechanism is designed using interference fit. When the two iron bars 81 are being pressed down, they move apart, towards the two ends, i.e., the girder securing member 84 and the square tube securing member 83 respectively. If one iron bar 81 moves toward the girder, the two bars 81 will become locked, but if moving away from the girder, the iron bars 81 will be released, which is similar to a kickstand of a bicycle. When the kickstand is pushed towards the front, it become more secured as it is more strongly pressured. When the kickstand is pushed backwards beyond a certain point, it will retract upwards towards the direction it is pushed, no longer functioning as a stand.

Figure 22A:
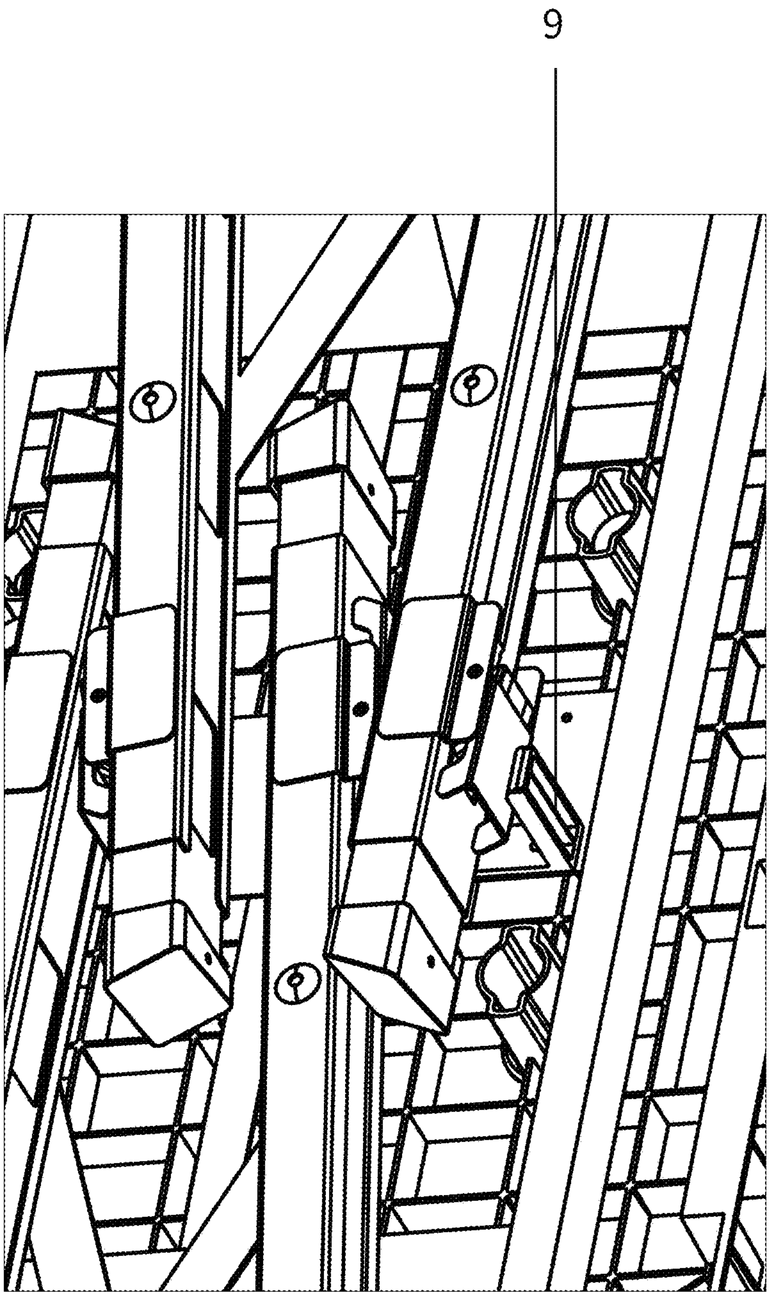
FIG. 22A-22E illustrates a third locking mechanism used to secure the supporting legs inside the receiving space.
Figure 22B:
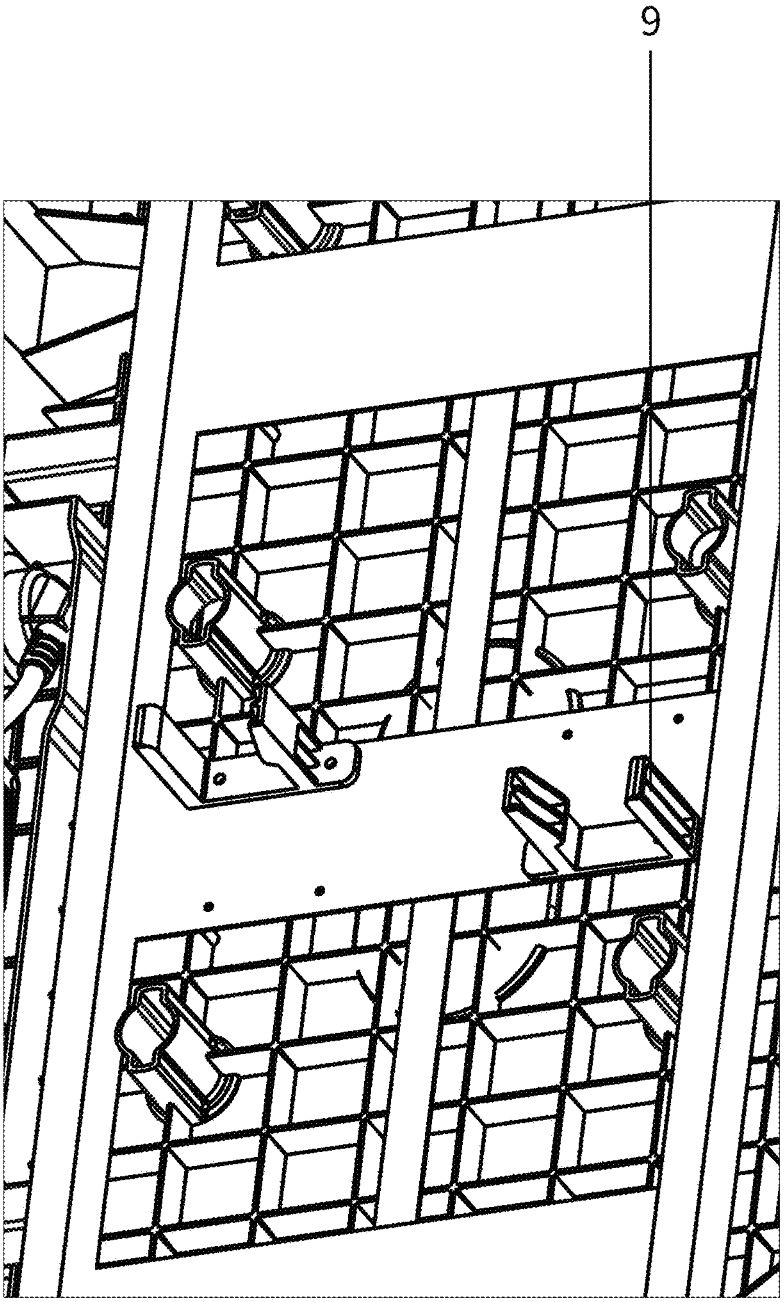
Figure 22C:
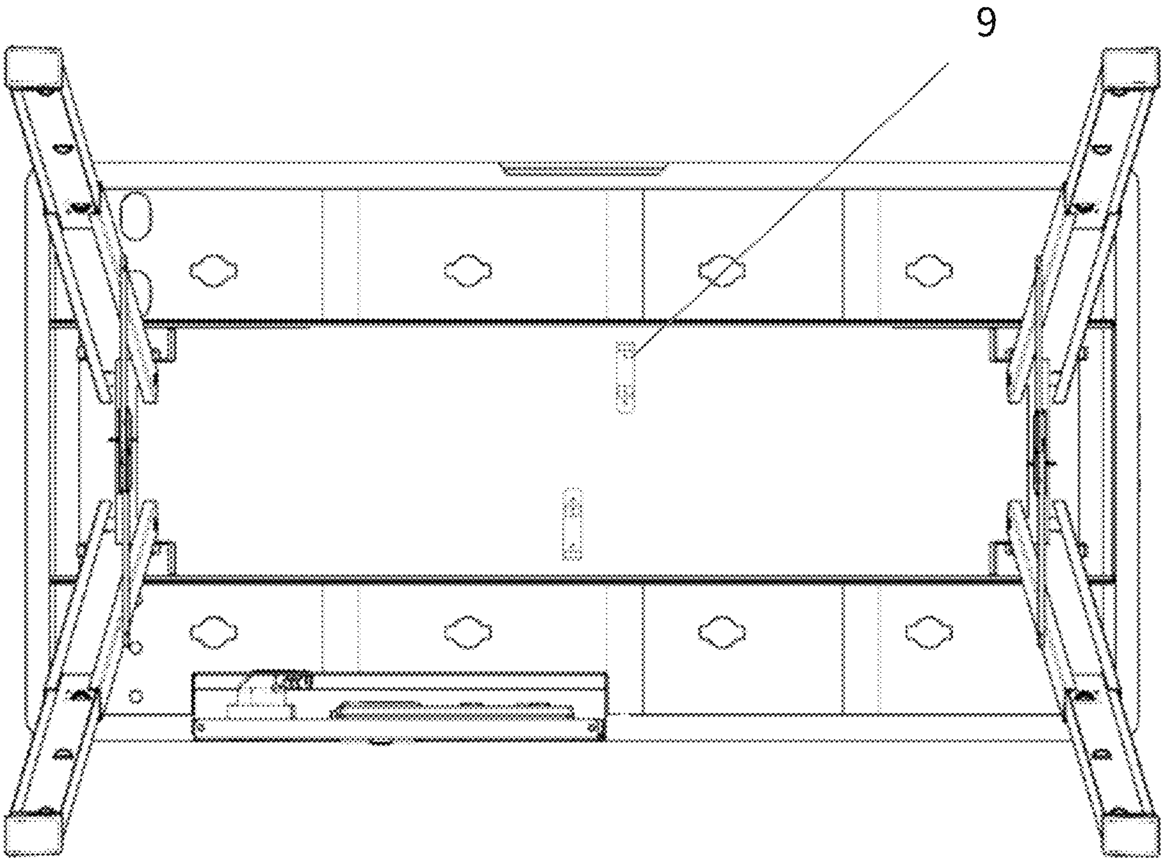
Figure 22D:
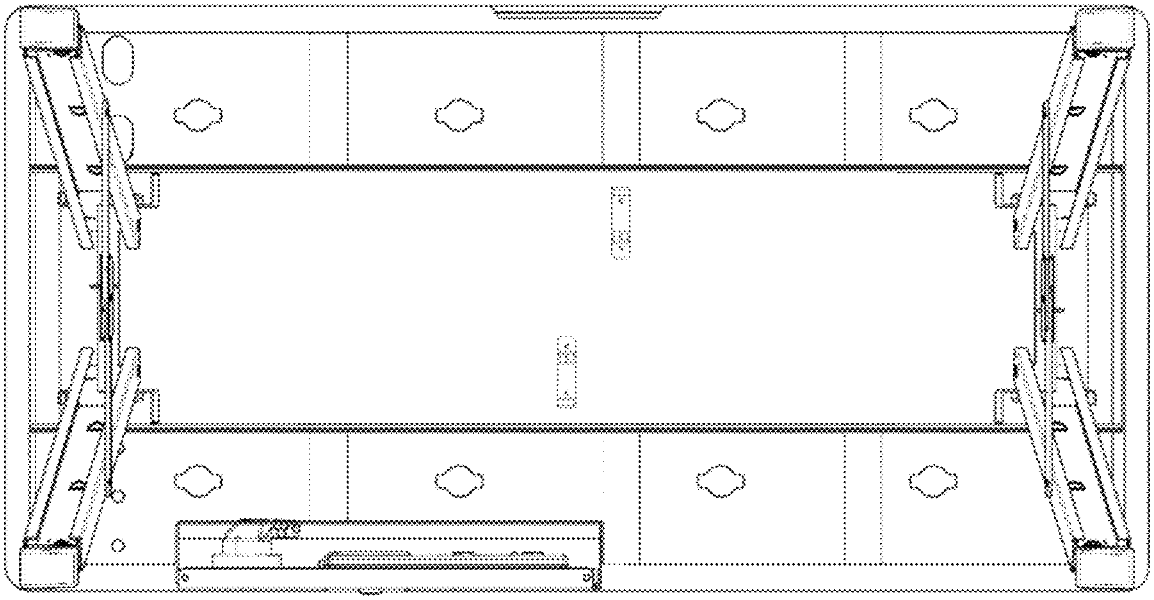
Figure 22E:
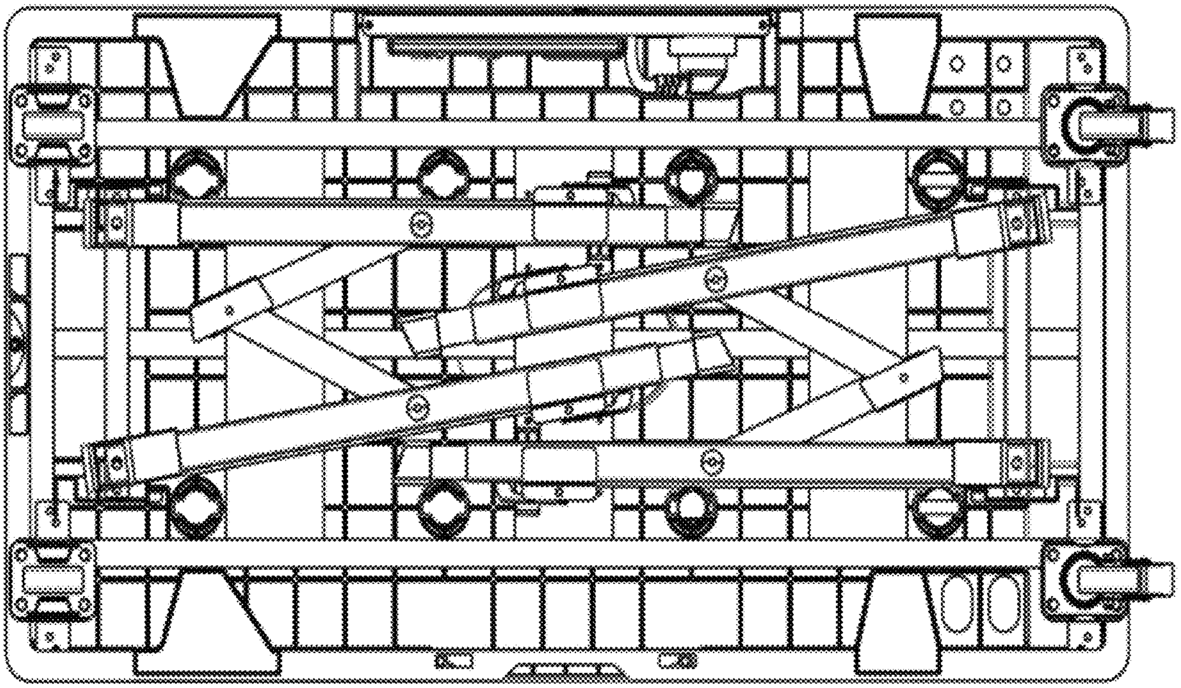

FIGS. 22A-22E illustrates a third locking mechanism 9 for securing the supporting legs when the supporting legs are folded into the receiving space of the girder. In FIG. 22A, the supporting legs are folded, and one of the legs is inserted into the third locking mechanism 9. In FIG. 22B, the supporting legs are released and FIG. 22B shows an empty third locking mechanism 9. In one embodiment, the third locking mechanism 9 is a bracket configured to clasp a supporting leg when the leg is pressed into the bracket, as shown in FIGS. 22C and 22D. In FIG. 22C, the supporting legs are stretched with each first supporting leg member extended out of the second supporting leg member. In FIG. 22C, the supporting legs are retracted.

Figure 7:
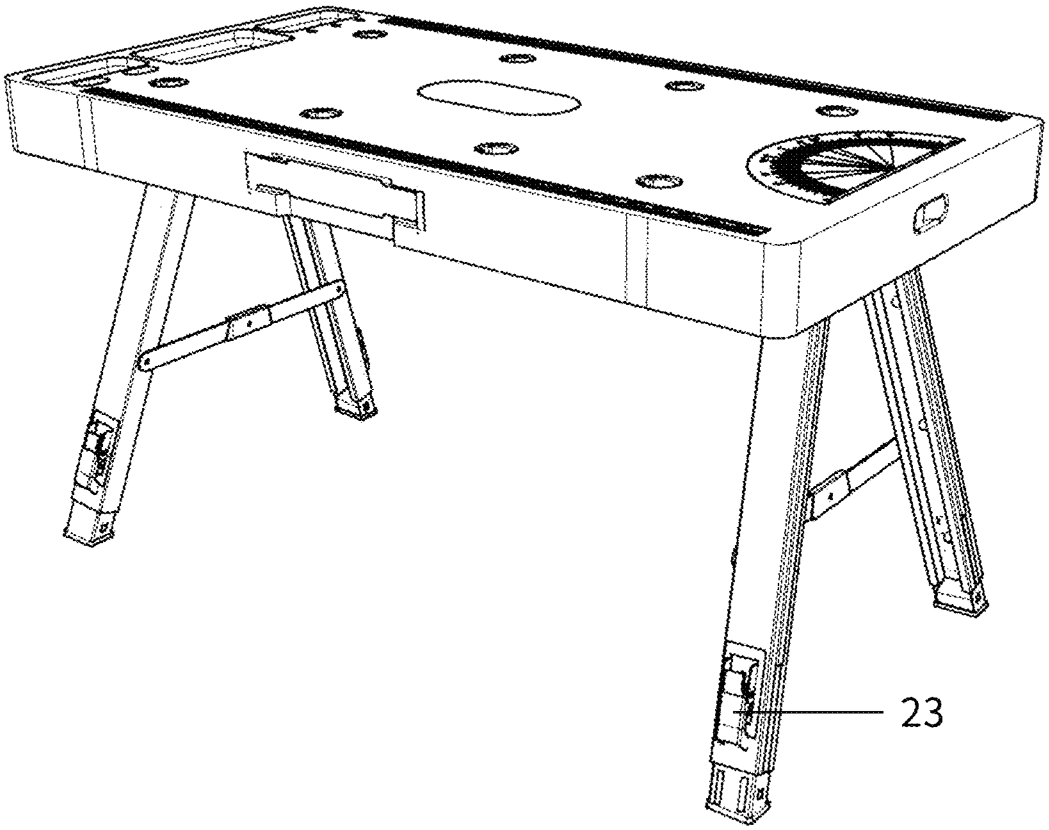
FIG. 7 to FIG. 10 are schematic diagrams of the multi-functional workbench configured in a step mode.
Figure 8:
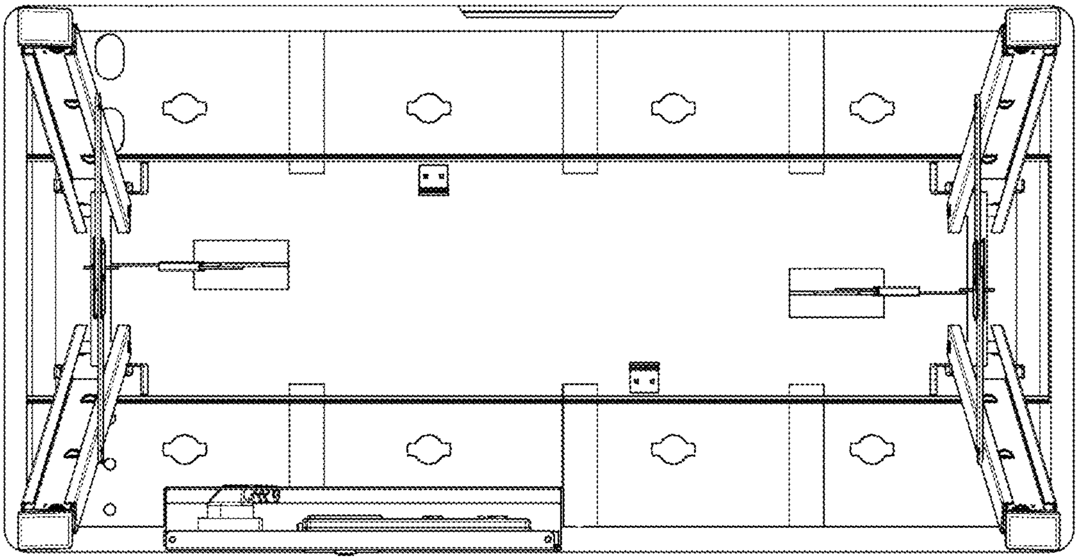

In some embodiments, the workbench 100 can be used as a step tool. This step mode may be selected according to actual needs. In the step tool mode, the supporting legs are released from the girder 3. To release the supporting legs 2, the second or third locking mechanism is unlocked and the supporting legs 2 are pulled out and are then locked by the first locking mechanism 7 to stand straight. In each supporting leg 2, the first supporting leg member 21 is received in the second supporting leg member 22, and is locked by the leg lock 23 shown in FIG. 7. The first supporting leg member 21 increases the load bearing capacity of the workbench 100 after the first supporting leg member 21 is retracted into the second supporting leg member 22 and reinforces the second supporting leg member 22. The load-bearing capacity of the workbench 100 decreases when the first supporting leg member 21 is pulled out from the second supporting leg member 22. In such configuration, the workbench may not be suitable for users to stand on it. The principle of the first locking mechanism 7 is similar to that of the second locking mechanism 8. The stable position of the two supporting bars 71 is when the two supporting bars 71 become almost horizontal. When pressing down towards the ground, the first locking mechanism 7 becomes more secured as it is pressed. The first locking mechanism 7 will not be easily released until the limiting member 72 is lifted.

In some embodiments, the workbench 100 can be used as a sawhorse. The workbench/sawhorse mode may be selected according to actual needs. The workbench/sawhorse mode is the configuration in which the first supporting leg members 21 in the step mode are fully pulled out.

One of the advantages of the workbench 100 described in the present disclosure is the structure of the supporting legs 2, which may be extended or retracted to make the workbench 100 function as a sawhorse or a step tool. The workbench 100 is versatile and cost-effective.

Several different configurations or variations of the workbench 100 can be made. For example, in some embodiments of the workbench 100, the supporting legs 2 may be designed as one piece, not retractable. In such embodiments, the workbench 100 is not suitable as a step tool. Other variations may include:

- a five-in-one full-functional version, including the five modes of workbench, sawhorse, step, creeper, and tractor;
- a four-in-one version, in which the supporting legs 2 are not extendable but the workbench 100 is still equipped with rollers, and implements the four modes of workbench, sawhorse, creeper, and tractor;
- a three-in-one version, which is provided with extendable supporting legs 2 but without rollers 17, and may implement the three modes of workbench sawhorse, and step; and
- a two-in-one version, which is provided with supporting legs 2 that are not extendable and without rollers 17, and may implement the two modes of workbench and sawhorse.

In the present disclosure, the workbench mode and the sawhorse mode are of the same structural form. But because of the creative use of the connector 101, the clamp 10, and the backer 103, the workbench 100 may be used in two different configurations.

In the present disclosure, although the creeper mode and the pulling tractor mode are in the same structural form, they are different modes because of the different functionalities.

The protection content of the present disclosure is not limited to the above embodiments. Without departing from the spirit and scope of the concept of the present disclosure, the changes and advantages that are conceivable by those skilled in the art are all included in the present disclosure, and the protection scope is subject to the appended claims Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A multi-functional workbench, comprising: a worktop and supporting legs, wherein the worktop is provided with a girder, and the bottom of the girder is provided with a receiving space;

concave-shaped mechanisms are fixed in the receiving space, and are connected by a tube, and both ends of the tube are rotatable;

the supporting legs are connected to the tube and drive the rotation of the tube, and the supporting legs are rotatably engageable into the concave-shaped mechanisms to be received in the receiving space;

a first locking mechanism is disposed between two supporting legs that are connected to the tube, wherein the first locking mechanism is configured to lock the supporting legs; and a second locking mechanism disposed on the girder for securing the supporting legs when the supporting legs are folded inside the receiving space.

2. The multi-functional workbench of claim 1, wherein each concave-shaped mechanism has a recess, the recesses of the two concave-shaped mechanisms connected to the tube are disposed oppositely, the supporting legs are attached to the tube in between the recesses, and protrusions of the recesses restrict continuous rotation of the supporting legs when the supporting legs are engaged into the recesses.

3. The multi-functional workbench of claim 1, wherein the first locking mechanism is configured to prevent the supporting legs from falling out of the concave-shaped mechanisms while the supporting legs are engaged into the concave-shaped mechanisms; and wherein the first locking mechanism comprises two supporting bars and a limiting member, respective ends of the supporting bars are connected to each other and axially rotatable about a connection point while the other ends are connected to the supporting legs, and the limiting member is disposed at the connection point to prevent the continuous rotation of the two supporting bars after the two supporting bars are in a straight line.

4. The multi-functional workbench of claim 1, wherein the second locking mechanism is connected to the tube, and the second locking mechanism is capable of locking the tube to prevent it from rotating while the supporting legs are received in the receiving space;

wherein the second locking mechanism comprises two locking bars, a locking member, a girder securing member, and a tube securing member;

wherein the girder securing member is secured at the bottom of the girder, the tube securing member is secured to the tube, one end of the two locking bars are connected to each other at a connection point and axially rotatable around the connection point while the other end of the two locking bars are rotatably connected to the girder securing member and the tube securing member respectively, and the locking member is disposed at the connection point to prevent further movement of the two locking bars after the two locking bars are aligned in a straight line through rotation.

5. The multi-functional workbench of claim 1, wherein the worktop is provided with a beam structure for distributing bearing load.

6. The multi-functional workbench of claim 5, wherein the beam structure comprises long beams near two opposing sides of the worktop and one or more short beams distributed between the two long beams on the underside of the worktop.

7. The multi-functional workbench of claim 1, wherein the bottom of the worktop is provided with detachable rollers.

8. The multi-functional workbench of claim 1, wherein each of the supporting legs has a first supporting leg member and a second supporting leg member that are coaxially connected, and wherein the first supporting leg member is received in the second supporting leg member, and a received length of the first supporting leg member is controlled by a lock.

9. The multi-functional workbench of claim 1, wherein a surface of the worktop includes a length scale and an angle scale.

10. The multi-functional workbench of claim 1, wherein an edge of the worktop is provided with traction pins.

11. The multi-functional workbench of claim 1, wherein the surface of the worktop has at least one tool tray.

12. The multi-functional workbench of claim 1, wherein the worktop is provided with at least one expandable connection through hole along a thickness direction.

13. The multi-functional workbench of claim 1, wherein the worktop is provided with a socket module.

* * * * *